(12) United States Patent
Xu et al.

(10) Patent No.: US 10,204,268 B2
(45) Date of Patent: Feb. 12, 2019

(54) METHOD AND SYSTEM FOR IDENTIFYING TRAIN NUMBER AND TRAIN TYPE, AND METHOD AND SYSTEM FOR SECURITY INSPECTION

(71) Applicant: Nuctech Company Limited, Beijing (CN)

(72) Inventors: Yanwei Xu, Beijing (CN); Weifeng Yu, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/280,113

(22) Filed: Sep. 29, 2016

(65) Prior Publication Data

US 2017/0186172 A1 Jun. 29, 2017

(30) Foreign Application Priority Data

Dec. 29, 2015 (CN) .......................... 2015 1 1016979

(51) Int. Cl.
*G06K 9/00* (2006.01)
*G06T 7/00* (2017.01)
(Continued)

(52) U.S. Cl.
CPC ........... *G06K 9/00624* (2013.01); *G06K 9/44* (2013.01); *G06T 7/0004* (2013.01);
(Continued)

(58) Field of Classification Search
CPC .. G06K 9/00624; G06K 9/44; G06K 2209/01; G06K 2209/19; G06T 7/0004;
(Continued)

(56) References Cited

U.S. PATENT DOCUMENTS

| 4,876,597 A * | 10/1989 | Roy ...................... B61L 25/041 |
| | | 348/143 |
| 2004/0158395 A1* | 8/2004 | Yamada .................. G01C 21/20 |
| | | 701/533 |

(Continued)

FOREIGN PATENT DOCUMENTS

| CN | 102708694 A | 10/2012 |
| CN | 103279998 A | 9/2013 |

(Continued)

OTHER PUBLICATIONS

International Search Report dated Oct. 26, 2016 received in International Application No. PCT/CN2016/094207, together with an English-language translation.

(Continued)

*Primary Examiner* — Ping Y Hsieh
(74) *Attorney, Agent, or Firm* — Scully, Scott, Murphy & Presser, P.C.

(57) ABSTRACT

The present disclosure provides a method and system for identifying a train number and train type. The method includes: continuously photographing a train under inspection by using a linear-array camera in motion relative to the train under inspection, and generating a plurality of partial images of the train; splicing the plurality of partial images of the train; correcting distortion of the spliced image; identifying a train number from the corrected image; wherein the correcting distortion of the spliced image includes: extracting a contour of a wheel from the spliced image; obtaining a ratio between a horizontal diameter and a vertical diameter of the wheel from the contour; if the ratio is greater than a first preset threshold, horizontally compressing the spliced image according to the ratio; and if the ratio is smaller than a second preset threshold, horizontally stretching the spliced image.

13 Claims, 4 Drawing Sheets

(51) Int. Cl.
 G06K 9/44 (2006.01)
 H04N 1/00 (2006.01)
 H04N 19/23 (2014.01)
(52) U.S. Cl.
 CPC ....... *G06T 7/0081* (2013.01); *H04N 1/00442* (2013.01); *H04N 19/23* (2014.11); *G06K 2209/01* (2013.01); *G06K 2209/19* (2013.01); *G06T 2200/32* (2013.01); *H04N 2209/045* (2013.01)
(58) Field of Classification Search
 CPC ................ G06T 2200/32; H04N 19/23; H04N 1/00442; H04N 2209/045
 USPC ......................................................... 382/104
 See application file for complete search history.

(56) References Cited

U.S. PATENT DOCUMENTS

| | | | |
|---|---|---|---|
| 2005/0169500 A1 | 8/2005 | Takahashi et al. | |
| 2011/0022253 A1* | 1/2011 | Chen | B61L 1/14 701/19 |
| 2011/0280448 A1 | 11/2011 | Hofman et al. | |
| 2013/0268147 A1* | 10/2013 | Chundru | B61C 17/12 701/19 |
| 2014/0088865 A1* | 3/2014 | Thies | G06Q 10/04 701/465 |
| 2014/0156123 A1* | 6/2014 | Cooper | B61K 9/08 701/19 |
| 2016/0068173 A1* | 3/2016 | Fuchs | B61L 15/0027 340/994 |

FOREIGN PATENT DOCUMENTS

| | | | | |
|---|---|---|---|---|
| CN | 103294997 A | | 9/2013 | |
| CN | 203311473 U | | 11/2013 | |
| CN | 103646381 A | | 3/2014 | |
| CN | 103679140 A | * | 3/2014 | ............ G06F 17/30 |
| CN | 103679140 A | | 3/2014 | |
| CN | 103839299 A | | 6/2014 | |
| CN | 104374785 A | | 2/2015 | |
| CN | 104391339 A | | 3/2015 | |
| CN | 104408431 A | | 3/2015 | |
| CN | 104463886 A | | 3/2015 | |
| CN | 105059327 A | | 11/2015 | |
| CN | 105447528 A | | 3/2016 | |
| RU | 111936 U1 | | 12/2011 | |
| RU | 133082 U1 | | 10/2013 | |
| WO | 2015/135015 A1 | | 9/2015 | |

OTHER PUBLICATIONS

Srivastava, S. et al, "Competing technology options and stakeholder interests for tracking freight railcars in Indian Railways", Journal of Information Technology, Sep. 8, 2009, pp. 392-400, vol. 24, No. 4.
Sei, H. et al, "A Meander Channel CCD Linear Image Sensor", IEEE Journal of Solid-State Circuits, Feb. 1, 1978, pp. 66-70, vol. 13, No. 1.
Zeng, H. et al, "An Automatic Wheel Contour Extraction Method", Feb. 1, 2014, pp. 61-67, vol. 165, No. 2.
Partial Supplementary European Search Report dated Nov. 13, 2018 received in related European Patent Application No. EP 16880600.8.

* cited by examiner

METHOD AND SYSTEM FOR IDENTIFYING TRAIN NUMBER AND TRAIN TYPE, AND METHOD AND SYSTEM FOR SECURITY INSPECTION

CROSS-REFERENCE TO RELATED APPLICATIONS

The present application is based upon and claims priority to Chinese Patent Application No. 201511016979.2, filed Dec. 29, 2015, the entire contents of which are incorporated herein by reference.

TECHNICAL FIELD

The present disclosure relates to the field of security inspection for trains, and in particular, to a method and system for identifying a train number and a train type, and a method and system for performing security inspection on a train.

BACKGROUND

In management and transportation of trains, train numbers need to be recorded and checked. Processing train numbers manually takes a lot of time and energy and is error-prone. One automatic process method is to use RFID (radio frequency identification devices) tags. However, this method requires high costs and sometimes cannot be used. Another process method is to use digital image process to automatically identify train numbers. By using the digital image process, identification can be performed by using complicated calculations, and relatively high process accuracy can be achieved. Thus, digital image process has become a common identification method. To identify train numbers by digital image process, images of sides of trains need to be obtained. If there is distortion in the captured images, the accuracy for identifying train numbers will be compromised.

Thus, it is needed to provide a train number identification method capable of identifying and removing distortion in images of trains.

The above information disclosed in the background portion is only used to reinforce understanding of the background of the present disclosure. Therefore, the above information may include information of the known related arts for persons of ordinary skill in the art.

SUMMARY

The present disclosure provides a method and system for train type identification, and a method and system for performing security inspection on trains, which are capable of automatically identifying the type of a train.

Other characteristics, features, and advantages of the present disclosure become obvious over the following description in detail, or are partially derived from practice of the present disclosure.

According to an aspect of the present disclosure, there is provided a train number identification method, including: continuously photographing a train under inspection by using a linear-array camera in motion relative to the train under inspection, and generating a plurality of partial images of the train; splicing the plurality of partial images of the train to obtain a spliced image; correcting distortion of the spliced image to obtain a corrected image; identifying a train number from the corrected image; wherein the correcting distortion of the spliced image includes: extracting a contour of a wheel from the spliced image; obtaining a ratio between a horizontal diameter and a vertical diameter of the wheel from the contour; if the ratio is greater than a first preset threshold, horizontally compressing the spliced image according to the ratio; and if the ratio is smaller than a second preset threshold, horizontally stretching the spliced image.

According to some embodiments, the plurality of partial images photographed by the linear-array camera at a preset photographing frequency are obtained by an image obtaining module.

According to some embodiments, the identifying the train number from the corrected image includes: cutting a train number region from the corrected image to obtain an image of the train number region; performing smoothing and binary processing on the image of the train number region; identifying the train number using a character identifying engine; and automatically correcting the identified train number according to a rule for defining train numbers.

According to another aspect of the present disclosure, there is provided a train number identification system, including: an image obtaining module configured to obtain a plurality of partial images of a train under inspection which are generated by continuously photographing the train under inspection using a linear-array camera in motion relative to the train under inspection; an image splicing module configured to splice the plurality of partial images of the train to obtain a spliced image; an image correction module configured to correct distortion of the spliced image to obtain a corrected image; a train number identification module configured to identify a train number from the corrected image; wherein the image correction module is configured to: extract a contour of a wheel from the spliced image; obtain a ratio between a horizontal diameter and a vertical diameter of the wheel from the contour; if the ratio is greater than a first preset threshold, horizontally compress the spliced image according to the ratio; and if the ratio is smaller than a second preset threshold, horizontally stretch the spliced image.

According to some embodiments, the image obtaining module is configured to obtain the plurality of partial images photographed by the linear-array camera at a preset photographing frequency.

According to some embodiments, the train number identification module is configured to: cut a train number region from the corrected image to obtain an image of the train number region; perform smoothing and binary processing on the image of the train number region; identify the train number using a character identifying engine; and automatically correct the identified train number according to a rule for defining train numbers.

According to another aspect of the present disclosure, there provided a train type identification method, including: identifying a train number of a train; and determining a type of the train according to the train number.

According to some embodiments, the identifying the training number of the train includes identifying the train number of the train using any one of the train number identification methods as described above.

According to some embodiments, the determining the type of the train according to the train number includes: searching a type from a data base or a data list using the train number.

According to some embodiments, the determining the type of the train according to the train number includes: directly determining the type of the train from the train number according to a rule for defining train numbers.

According to another aspect of the present disclosure, there is provided a train type identification system, including: a train number identification module configured to identify a train number of a train; and a train type determination module configured to determine a type of the train according to the train number.

According to some embodiments, the train number identification module is any one of the train number identification systems as described above.

According to some embodiments, the train type determination module is configured to search a type from a data base or a data list using the train number.

According to some embodiments, the train type determination module is configured to directly determine the type of the train from the train number according to a rule for defining train numbers.

According to some embodiments, the type of the train is any one of a locomotive train, a freight train, and a passenger train.

According to some embodiments, the train type identification system further includes: a coupler identification module configured to identify positions of couplers of the train; and an image partitioning module configured to partition an image of the train into a plurality of sub-images of the train according to the positions of the couplers According to another aspect of the present disclosure, there is provided a method for performing security inspection on a train, including: identifying a type of a train under inspection which enters an inspection region by using any one of the train type identification methods as described above; and if the train under inspection is a locomotive train or a passenger train, irradiating the train under inspection with a low dosage or not irradiating the train under inspection; and if the train under inspection is a freight train, irradiating the train under inspection with a high dosage.

According to another aspect of the present disclosure, there is provided a system for performing security inspection on a train, including: any one of the train type identification systems as described above; and a radiation control module configured to, according to a type of a train under inspection as determined by the train type identification system, control a ray source to irradiate the train under inspection with a first dosage or not irradiate the train under inspection when the train under inspection is a locomotive train or a passenger train, and control the ray source to irradiate the train under inspection with a second dosage when the train under inspection is a freight train, wherein the first dosage is smaller than the second dosage.

The method and system for train type identification and the method and system for performing security inspection on a train provided by the present disclosure can realize automatic identification of train type and security inspection of a train, and have advantages such as high efficiency and ease of use. Further, the method and system of the present disclosure can automatically recognize refitted vehicles.

BRIEF DESCRIPTION OF THE DRAWINGS

Exemplary embodiments of the present disclosure are described in detail with reference to the accompanying drawings. With such drawings, the above features and other features and advantages would become more obvious.

DETAILED DESCRIPTION

Figure 1A:
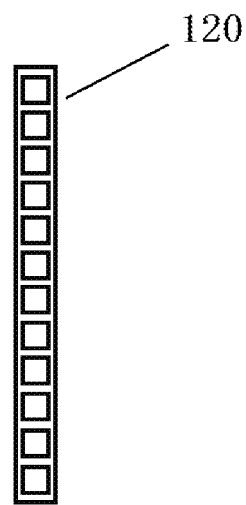
FIG. 1A schematically illustrates a linear-array camera for use in a train number and type identification apparatus according to some exemplary embodiments of the present disclosure.

Exemplary embodiments of the present disclosure are hereinafter described in detail with reference to the accompany drawings. However, the exemplary embodiments may be implemented in a plurality of manners, and should not be construed as being limited to the implementation described hereinafter. On the contrary, such exemplary embodiments more thoroughly and completely illustrate the present disclosure, and convey the concepts of the exemplary embodiments to persons skilled in the art. In the drawings, like reference numerals denote like or similar structures or elements. Therefore, detailed descriptions of these structures or elements are not given any further.

In addition, the described characteristics, structures, or features may be incorporated in one or more embodiments in any suitable manner. In the description hereinafter, more details are provided such that sufficient understanding of the embodiments of the present disclosure may be achieved. However, a person skilled in the art would be aware that the technical solutions of the present disclosure may be practiced without one or more of the specific details, or may be practiced using other methods, components, materials, apparatuses, steps or the like. Under other circumstances, commonly known structures, methods, apparatuses, practices, materials or operations are not illustrated or described in detail to avoid confusing aspects of the present disclosure.

The block diagrams illustrated in the drawings are merely functional entities, but are not necessarily physically independent entities. That is, these functional entities may be implemented by means of software, or these functional entities or a portion of these functional entities may be implemented in one or a plurality of software hardened modules, or these functional entities may be implemented in different networks and/or processors and/or microcontrollers.

The present disclosure provides a real-time drawing system, and a security inspection system and method for use in a large-scale target, such that a person who is in charge of the security inspection can know a scanning progress by means of real-time images, and make a preliminary judgment on an object under inspection according to the real-time images.

Figure 1B:
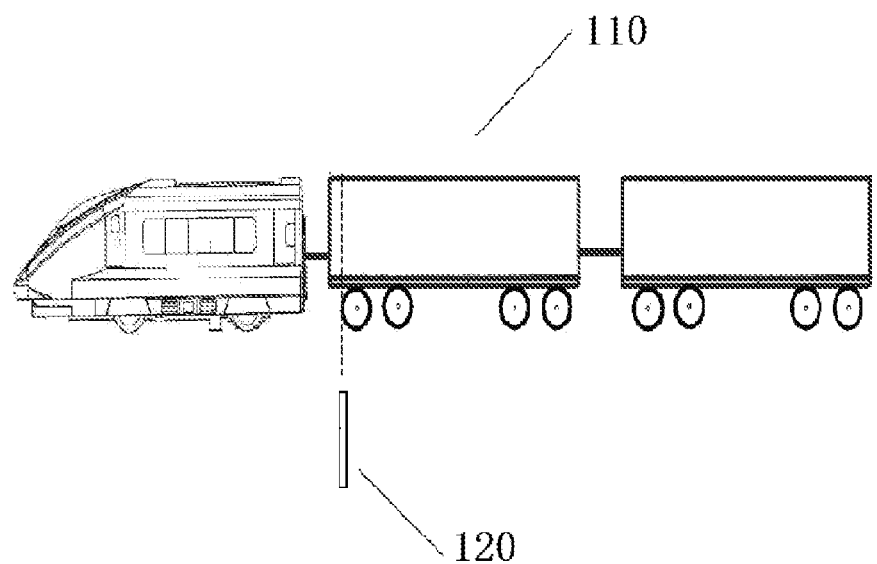
FIG. 1B schematically illustrates train number and type identification according to some exemplary embodiments of the present disclosure.

FIG. 1A schematically illustrates a linear-array camera 120 for use in a train number and type identification apparatus according to some embodiments of the present disclosure. FIG. 1B schematically illustrates train number and type identification according to some embodiments of the present disclosure.

As illustrated in FIGS. 1A and 1B, a linear-array camera 120 may be used to photograph a train 110 to perform train number and type identification.

In the method for train number and type identification method of the present disclosure, the images of trains obtained by the linear-array camera 120 can be used for train type identification.

Figure 2:
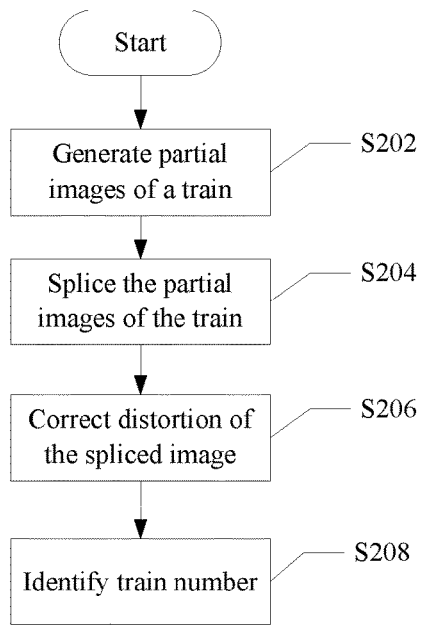
FIG. 2 illustrates a train number identification method according to some embodiments of the present disclosure.

FIG. 2 illustrates a train number identification method according to some embodiments of the present disclosure.

Referring to FIG. 2, in S202, with the train number identification method according to the present disclosure, a linear-array camera in motion relative to a train under inspection continuously photographs the train under inspection to generate a plurality of partial images of the train. Principles and usage of the linear-array camera are well known, which are not described herein. During photographing of the train under inspection by using the linear-array camera, the linear-array camera may be arranged on a side of the train to obtain images of the side of the train. However, the present disclosure is not limited to this. For example, the linear-array camera may also be arranged above the train according to the actual needs, to obtain a top image of the train. Alternatively, linear-array cameras may be arranged at a plurality of positions to obtain train images from more directions. Further, the train number mentioned in the present disclosure should be interpreted broadly without being limited to official train number. For example, the train number herein may also refer to a mark placed on any position of the train body for identifying the train.

In S204, the plurality of partial images of the train are spliced to obtain a spliced image. For example, the plurality of partial images of the train may be spliced by using a computer image processing system to obtain the image of the train. As described hereinafter, in the image splicing process, the image may be processed. Alternatively, the image may be processed according to the actual condition upon completion of splicing.

In S206, distortion of the spliced image is corrected to obtain a corrected image.

Distortion of the train image may affect identification of the train number. The distortion of the train image is related to the train speed and the photographing frequency of the camera. According to some embodiments of the present disclosure, the linear-array camera may be controlled to continuously photograph the train under inspection at a photographing frequency calculated according to a relative speed of the train under inspection.

It is simple to understand that, the ratio between the relative speed of the train under inspection within each time period and the quantity of partial images of the train within the time period is determined by an object width identified by each imaging unit in the linear-array camera each second.

For example, if it is assumed that a focal distance f of the linear-array camera is 35 mm, a width d (which is generally the width of a pixel point in the linear-array camera; if the linear-array camera uses n pixels, the width of the imaging unit is n times of the width of one pixel accordingly) of an imaging element is 14 μm, an object distance h is 2.5 m, an object width (the width of an object to be identified by each imaging element) W=d×h/f=1 mm, then the magnification of the linear-array camera in this case is h/f=7143. If it is assumed that a photographing frequency of the linear-array camera is 10 kHz, whereas an object width identified by each imaging element per second is D=10000 partial images×1 mm=10 m, that is, each imaging element has an identification rate of 10 m/s=36 km/h. In this case, a ratio between the relative speed of the train within each time period and the quantity of partial images of the train within the time period is 36 km/h÷10000 partial images/s=1 mm/partial image (herein the time period is set as is), and this ratio is the object width w identified by each imaging element. If the train passes a photographing region at a speed of 36 km/h, the linear-array camera is capable of obtaining an image with the same proportion with the physical object (which is not subject to compression or stretching) at the photographing frequency. If the train passes the photographing region at a speed of 18 km/h, the original 10000 partial images/s is adjusted to 5000 partial images/s by using an algorithm, and the ratio between the relative speed of the train within each time period and the quantity of partial images of the train within the time period is 18 km/h÷5000 partial images/s=1 mm/partial image (herein the time period is also set as 1 s), and this ratio is also the object width w identified by each imaging element. As derived from the above theory, the quantity of the partial images of the train that are used may be determined according to the train speed actually measured and the above ratio. In this way, the spliced train image may be a train image free of distortion.

There are a plurality of approaches available for measuring the train speed. The train speed may be directly measured by using a speed sensor such as a speed measurement radar arranged near the linear-array camera. Alternatively, the train speed may be also measured based on the time points the train passes two position sensors and based on the distance between the two position sensors by using two position sensors such as induction coils and/or photoelectric switches and/or electronic screens. According to some embodiments, optionally, after the train under inspection is detected by using a radar or a sensor, the linear-array camera is controlled to immediately photograph or start photographing with a delay. For example, by using position sensors such as photoelectric switches or electronic screens, when the train comes, the sensor is blocked, such that the sensor senses the coming of the train. Alternatively, arrival of a train may be known by using speed sensors such as speed measurement radar. Optionally, the speed of the train may be fed back in real time, and the frequency in photographing, by the linear-array camera, the train to generate the partial images of the train may be adjusted according to the fed back speed, such that the partial image generating frequency of the linear-array camera within each time period is proportional to the average speed of the train within the time period, thereby preventing image distortion. The sensor(s) may be arranged adjacent to the linear-array camera, and when the train reaches within a sensing range of the sensor, the sensor issues an instruction in real time to instruct the linear-array camera to immediately photograph the train. Alternatively, the sensor may also be arranged before the linear-array camera by a predetermined distance. When the sensor detects that the train arrives, the sensor instructs the linear-array camera to immediately photograph the train, or instructs the linear-array camera to start photographing the train with a specific delay.

It is simply to understand that the linear-array camera may be controlled to continuously photograph the train under inspection according to a predetermined photographing frequency (for example, if the photographing frequency of the linear-array camera is 10 kHz, that is, 10000 partial images/s, one partial image of the train is generated per 1/10000 second), and the quantity of the partial images can be adjusted. For example, contiguous time periods may be defined, and the quantity of the partial images within each time period may be adjusted according to a relative speed of the train under inspection in each time period based on the above described principles, such that ratio between the relative speed of the train under inspection within each time period and the quantity of the partial images within the time period remains consistent.

If the relative speed of the train under inspection is lower than a relative speed corresponding to the predetermined photographing frequency, at least one partial image may be subtracted, according to a predetermined rule, from the partial images obtained within the time period. If the relative speed of the train under inspection is higher than the relative speed corresponding to the predetermined photographing frequency, at least one partial image may be added into the partial images obtained within the time period by means of interpolation.

For example, the time period may be defined via calculation according to the quantity of partial images and/or train speed, or may be manually set, for example, the time period may be set as 1s or 10 s. Generally, a high train speed requires a high photographing frequency of the linear-array camera, and the time period can be set relatively short. However, generally more than one partial image is generated within a time period. The train speed within each time period may be an average speed of the train within the time period or the speed of the train at the beginning or end of this time period.

According to some embodiments, the linear-array camera, at a maximum photographing frequency, captures a maximum number of partial images within a train inspection time period (that is, time duration for the entire train to pass). If the speed of the train under inspection within a time period is lower than the maximum speed, the quantity of partial images within this time period is reduced by means of subtraction according to a difference between the actual speed and the maximum speed, such that the train speed within each time period is approximately proportional to the quantity of partial images generated. This can prevent image distortion caused by the train speed. For example, if the maximum speed of the train within the inspection time period is 30 km/h, a corresponding photographing frequency is 50 partial images/s (that is, the frequency of generating the partial images of the train), and if the train speed within a time period is measured to be 24 km/h, the quantity of partial images within this time period changes to 40 partial images/s accordingly, that is, one partial image is subtracted from each five partial images. The partial images may be subtracted according to a predetermined rule, for example, subtracting three partial images from each five partial images. As such, it is ensured that the train speed is proportional to the quantity of the partial images of the train, such that the image of the train obtained via splicing the partial images of the train obtained within each time period by the linear-array camera is free of distortion.

For example, the linear-array camera can photograph the train at an average photographing frequency, which corresponds to a most frequent train speed or an average train speed within the inspection time period. If the train speed within a time period is higher than the most frequent train speed or the average train speed, interpolation can be used to avoid distortion. For example, two images continuously photographed at a suitable position within the time period are subject to fitting and smoothing, to achieve interpolation between the two partial images to form new partial images of the train. In this way, the obtained image, although having a lower resolution than that of the partial images obtained via photographing, has an equal proportion relationship in the image in terms of distance, to the train profile and the actual train. If the train speed within a time period is lower than the most frequent train speed, the quantity of partial images is reduced via the above subtraction method. For example, if the average speed of the train is 30 km/h, a corresponding photographing frequency is 50 partial images/s (that is, the frequency of generating the partial images of the train), and if the train speed within a time period is measured to be 36 km/h, the quantity of partial images within this time period changes to 60 partial images/s accordingly, that is, one partial image is added to each five partial images. For example, a new partial image of the train obtained via fitting or averaging may be added between the second partial image and the third partial image of the train. This ensures that the train speed is proportional to the quantity of the partial images of the train.

Various methods can be used to correct the spliced image.

According to an exemplary embodiment of the present disclosure, the image is corrected by using the wheel profile as a reference. Such correction manner is simple and effective, and may improve the processing efficiency and reduce the processing cost.

For example, after a spliced image is obtained, the wheel profile may be extracted from the spliced image. Then, a ratio between a horizontal diameter and a vertical diameter of the wheel is obtained from the wheel profile. If the ratio is greater than a first predetermined threshold, the spliced image is horizontally compressed according to the ratio; and if the ratio is smaller than a second predetermined threshold, the spliced image is horizontally stretched. Finally, a train image with small distortion is obtained for subsequent operations.

In 208, train number is identified. The train number can be identified based on the obtained image of the train using conventional train number identification methods. For example, a train number region can be cut from the corrected image, smoothing (smoothing can remove noise) and binary processing can be performed on the image of the train number region, and then the image of the train number region is sent to a character identifying engine to identify the train number. Finally, the train number identified by the character identifying engine can be automatically corrected according to a rule for defining train numbers. Because the train number identification methods are well known by those skilled in this art and details will not be elaborated herein.

For the convenience of reviewing the image by an operator, according to some embodiments, positions of couplers (i.e., couplers between train carriages, used for coupling the carriages) of the train may be identified from the obtained train image, and then the image of the train may be partitioned into a plurality of sub-images according to the positions of the couplers.

The train number identification method according to the present disclosure is described above. A train number identification system which may implement the above described method will be described below.

Figure 3:
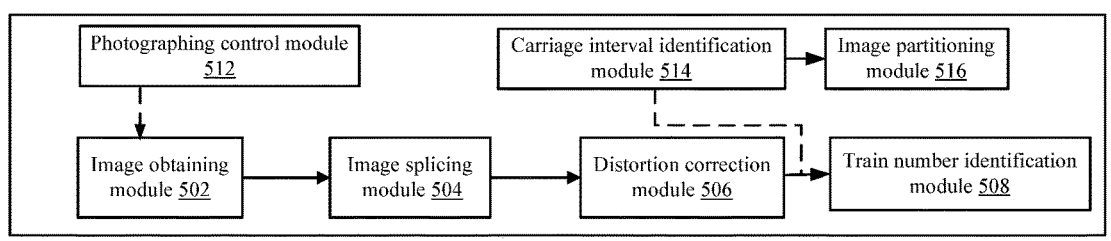
FIG. 3 illustrates a train number identification system according to some embodiments of the present disclosure.

As illustrated in FIG. 3, a train number identification system according to some embodiments of the present disclosure may include an image obtaining module 502, an image splicing module 504, a distortion correction module 506, and a train number identification module 508.

The image obtaining module 502 is configured to obtain a plurality of partial images of a train under inspection which are generated by continuously photographing the train under inspection using a linear-array camera in motion relative to the train under inspection.

In a modified embodiment, the system may further include a photographing control module 512, configured to continuously photograph the train under inspection according to a photographing frequency calculated according to a relative speed of the train under inspection. Alternatively, the image obtaining module 502 acquires a plurality of partial images photographed by the linear-array camera according to a predetermined photographing frequency.

The image splicing module 504 is configured to splice the plurality of partial images of the train to obtain a spliced image.

In a modified embodiment, the splicing module 504 is further configured to define contiguous time periods, and adjust the quantity of partial images of the train within each time period according to a relative speed of the train under inspection in each time period, such that a proportion of the relative speed of the train under inspection within each time period and the quantity of the partial images of the train within the time period remains consistent. If the relative speed of the train under inspection is lower than a relative speed corresponding to the predetermined photographing frequency, at least one partial image is subtracted, according to a predetermined rule, from the partial images of the train obtained within the time period; and if the relative speed of the train under inspection is higher than the relative speed corresponding to the predetermined photographing frequency, at least one partial image is added into the partial images of the train obtained within the time period by means of interpolation.

The distortion correction module 506 is configured to correct distortion of the spliced image.

For example, the distortion correction module 506 can be configured to: extract a contour of a wheel from the spliced image; obtain a ratio between a horizontal diameter and a vertical diameter of the wheel from the contour; if the ratio is greater than a first preset threshold, horizontally compress the spliced image according to the ratio; and if the ratio is smaller than a second preset threshold, horizontally stretch the spliced image.

The train number identification module 508 is configured to identify a train number from the corrected image, and detailed descriptions are omitted here.

Also, the type of the train can be identified according to the train number.

Train type identification has been widely applied in practice, for example, the train security inspection or train repairing field. In the train security inspection field, different train types may be distinguished to determine whether a train under inspection carries passengers, such that different X-ray dosages may be defined, or a carriage carrying no passenger is subject to X-ray scanning whereas a carriage carrying passengers is not subject to X-ray scanning. This requires identification of train type first to determine whether a train entering the inspection region is a locomotive or a passenger train carrying passengers.

The train types are categorized into locomotive train, passenger train, freight train and the like. The freight trains are finely categorized into container freight train, cargo train, oil tank train, trailer and the like. Trains of different types have different wheelbases, heights, carrying objects (for example, the carrying objects of different types of trains may be one or more of passengers, solid goods, liquid goods and the like). In a train type identification method, a plurality of train inspection points are arranged along a railway, and magnetic steel is deployed at each inspection point. A relative speed and a shaft position of the train are detected to determine the wheelbase. Passenger trains can be distinguished from the freight trains based on the differences in wheelbases. However, different countries have stipulated different standards for the carriages, such that the trains of one type may not necessarily have the same wheelbase. Therefore, carriages of the same type in different countries may not be identified by using the wheelbase measurement method. In addition, sometimes the carriages are refitted (for example, the passenger carriages can be refitted into thermal carriages which carries cargos instead of passengers), such that the carrying objects change but the wheelbase generally remains the same. As such, the carrying objects of the carriages may not be identified by means of measuring the wheelbase.

Figure 4:
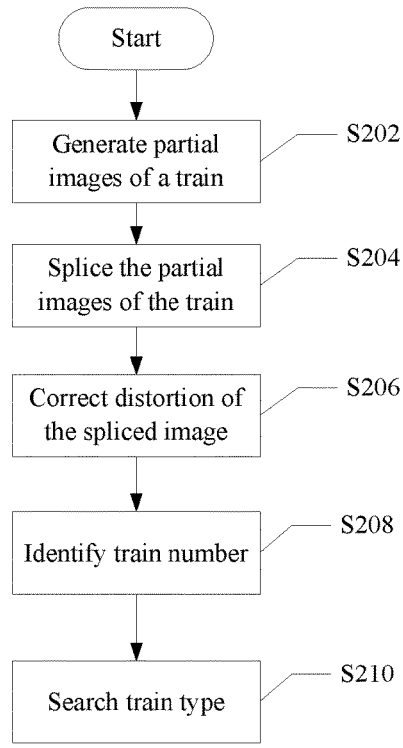
FIG. 4 illustrates a train type identification method according to some embodiments of the present disclosure.

FIG. 4 shows a train type identification method according to an embodiment of the present disclosure. The embodiment in FIG. 4 uses the method described in connection with FIG. 2. Specifically, a train type determination operation S210 is added. The details about S210 will be described below.

In S210, a type is searched from a data base or a data list using the identified train number. For example, the data base or the data list can record a corresponding relationship between train numbers and train types, and by using the identified train number, a train type can be found and thereby the type of the train can be determined. In a modified embodiment, searching cannot be performed; instead, the type of the train can be determined directly from the train number according to a rule defining train numbers. For example, according to the rule for defining train numbers, the first two characters can represent the type of a train.

It should be understood that the train type identification method according to the present disclosure is not limited to using the train number identified according to the method provided by the present disclosure.

Figure 5:
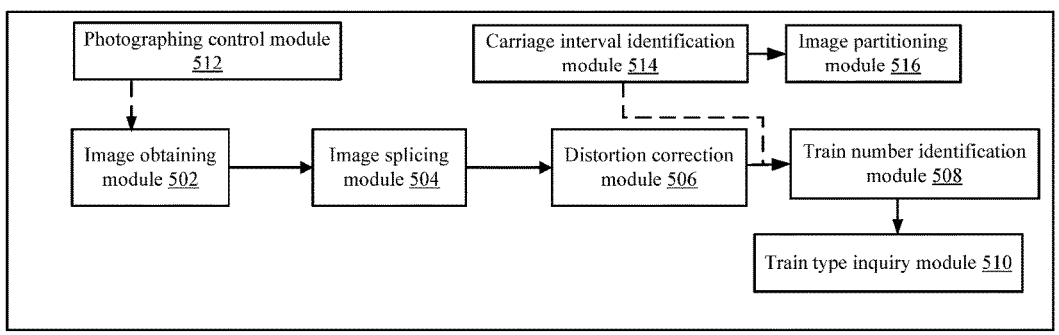
FIG. 5 illustrates a train type identification system according to some embodiments of the present disclosure.

FIG. 5 shows a train type identification system according to an embodiment of the present disclosure. The embodiment as shown in FIG. 5 uses the system described in connection with FIG. 3. Specifically, a train type determination module 510 is added.

The train type determination module 510 can search a type from a data base or a data list using the identified train number. For example, For example, the data base or the data list can record a corresponding relationship between train numbers and train types, and by using the identified train number, a train type can be found and thereby the type of the train can be determined. In a modified embodiment, the train type determination module 510 does not need to perform searching; instead, the train type identification module 510 can determine the type of the train directly from the train number according to a rule defining train numbers.

In a modified embodiment, the system can further include a coupler identification module 514 and an image partitioning module 516. The coupler identification module 514 is configured to identify positions of couplers of the train. The image partitioning module 516 is configured to partition an image of the train into a plurality of sub-images of the train according to the positions of the couplers.

It should be understood that the train type identification system according to the present disclosure is not limited to using the train number identification system according to the present disclosure.

Figure 6:
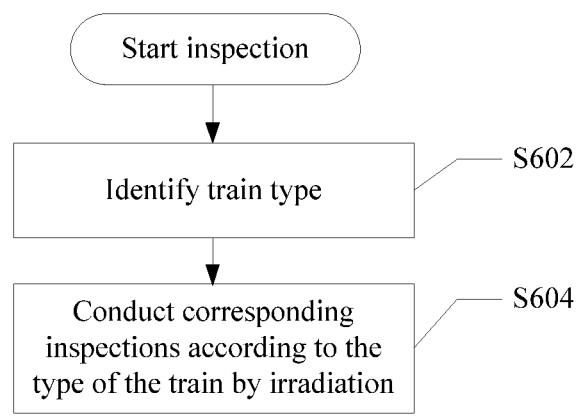
FIG. 6 illustrates a method for performing security inspection on a train according to some embodiments of the present disclosure.

Using the train type identification method of the present disclosure, security inspection on trains can be realized, as shown in FIG. 6.

Referring to FIG. 6, in step 602, a type of a train under inspection which enters an inspection region is identified by using the train type identification method described above.

In step 604, corresponding inspections are conducted according to the type of the train by irradiation. If the train under inspection is a locomotive train or a passenger train, the train under inspection is irradiated with a low dosage or the train under inspection is not irradiated; and if the train under inspection is a freight train, the train under inspection is irradiated with a high dosage.

Figure 7:
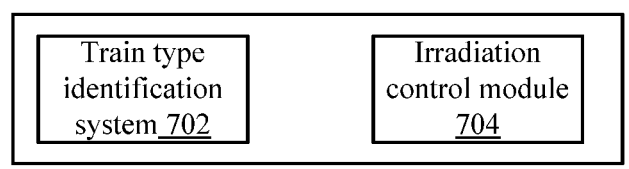
FIG. 7 illustrates a system for performing security inspection on a train according to some embodiments of the present disclosure.

FIG. 7 shows a system for performing security inspection on a train according to some embodiments of the present disclosure, which can implement the above method for performing security inspection on a train.

As shown in FIG. 7, the system for performing security inspection on a train can include the train type identification system 702 and a radiation control module 704. The radiation control module 704 is configured to, according to a type of a train under inspection as determined by the train type identification system, control a ray source to irradiate the train under inspection with a first dosage or not irradiate the train under inspection when the train under inspection is a locomotive train or a passenger train, and control the ray source to irradiate the train under inspection with a second dosage when the train under inspection is a freight train, wherein the first dosage is smaller than the second dosage. The train type identification system 702 has been described above and repeated descriptions are omitted here.

Through the above detailed description, a person skilled in the art would understand that the system and method according to the embodiments of the present disclosure has one or more of the following advantages.

Correcting distortion using the wheel profile and thereby identifying the train number is simple and convenient in operation.

Determining the train type according to the train number is simple and easy to realize, and can result in high identification accuracy.

Based on the above description of the embodiments, a person skilled in the art would simply understand that the method and corresponding modules according to the embodiments of the present disclosure may be implemented by means of software or partial hardening of the software. Based on such understandings, the technical solutions according to the embodiments of the present disclosure may be essentially embodied in the form of a software product. The software product may be stored in a non-volatile storage medium such as a read only memory (ROM), a U disk, a mobile hard disk and the like. The software product includes a number of instructions that enable a computer device (a PC, a server, a mobile terminal or a network device) to perform the method provided in the embodiments of the present disclosure.

All or a part of modules of the device or system provided by the present disclosure may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the present disclosure may be implemented with a combination of software and hardware. For example, the method of the present disclosure can be performed based on program codes or instructions executed on a processor.

According to an embodiment of the present disclosure, there is provided a train number identification system, including:
a processor; and
a memory for storing instructions executable by the processor;

wherein the processor is configured to:
obtain a plurality of partial images of a train under inspection which are generated by continuously photographing the train under inspection using a linear-array camera in motion relative to the train under inspection;
splice the plurality of partial images of the train to obtain a spliced image;
correct distortion of the spliced image to obtain a corrected image; and
identify a train number from the corrected image;
wherein the correcting of distortion of the spliced image comprises:
extracting a contour of a wheel from the spliced image;
obtaining a ratio between a horizontal diameter and a vertical diameter of the wheel from the contour;
if the ratio is greater than a first preset threshold, horizontally compressing the spliced image according to the ratio; and if the ratio is smaller than a second preset threshold, horizontally stretching the spliced image.

A person skilled in the art may understand that the accompanying drawings are only intended to schematically illustrate the exemplary embodiments, and the modules or flows in the drawings are not necessary for the embodiments of the present disclosure, which thus cause no limitation to the protection scope of the present disclosure.

A person skilled in the art would understand that the above modules may be arranged in the apparatus according to the description given in the embodiments, or may be subject to corresponding variations and arranged in one or more apparatuses different from that in this embodiment. The modules according to the above embodiments may be combined in one module, or split into a plurality of submodules.

Detailed above are exemplary embodiments of the present disclosure. It should be understood that the present disclosure is not limited to the above exemplary embodiments. On the contrary, the present disclosure is intended to cover various modifications and equivalent deployments within the spirit and scope of the appended claims.

What is claimed is:

1. A train number identification system, comprising:
a processor; and
a memory storing instructions executable by the processor,
wherein the processor is configured to:
obtain a plurality of partial images of a train under inspection which are generated by continuously photographing the train wider inspection using a linear-array camera in motion relative to the train under inspection;
splice the plurality of partial images of the train to obtain a spliced image;
correct distortion of the spliced image to obtain a corrected image; and
identify a train number from the corrected image;
wherein the correcting of distortion of the spliced image comprises:
extracting a contour of a wheel from the spliced image;
obtaining a ratio between a horizontal diameter and a vertical diameter of the wheel from the contour,
if the ratio is greater than a first preset threshold, horizontally compressing the spliced image according to the ratio; and if the ratio is smaller than a second preset threshold, horizontally stretching the spliced image.

2. The train number identification system according to claim 1, wherein the processor is configured to obtain the plurality of partial images photographed by the linear-array camera at a preset photographing frequency.

3. The train number identification system according to claim 1, wherein the processor is configured to:
cut a train number region from the corrected image to obtain an image of the train number region;
perform smoothing and binary processing on the image of the train number region;
identify the train number using a character identifying engine; and
automatically correct the identified train number according to a rule for defining train numbers.

4. A train type identification system, comprising:
a train number identification module configured to identify a train number of a train; and
a train type determination module configured to determine a type of the train according to the train number,
wherein the train number identification module is a train number identification system;
wherein the train number identification system comprises:
a processor; and
a memory storing instructions executable by the processor;
wherein the processor is configured to:
obtain a plurality of partial images of a train under inspection which are generated by continuously photographing the train under inspection using a linear-array camera in motion relative to the train under inspection;
splice the plurality of partial images of the train to obtain a spiked image;
correct distortion of the spliced image to obtain a corrected image; and
identify a train number from the corrected image;
wherein the correcting of distortion of the spliced image comprises:
extracting a contour of a wheel from the spliced image;
obtaining a ratio between a horizontal diameter and a vertical diameter of the wheel from the contour;
if the ratio is greater than a first preset threshold, horizontally compressing the spliced image according to the ratio; and if the ratio is smaller than a second preset threshold, horizontally stretching the spliced image.

5. The train type identification system according to claim 4, wherein the train type determination module is configured to search a type from a data base or a data list using the train number.

6. The train type identification system according to claim 4, wherein the train type determination module is configured to directly determine the type of the train from the train number according to a rule for defining train numbers.

7. The train type identification system according to claim 4, wherein the type of the train is any one of a locomotive train, a freight train, and a passenger train.

8. The train type identification system according to claim 4, further comprising:
a coupler identification module configured to identify positions of couplers of the train; and
an image partitioning module configured to partition an image of the train into a plurality of sub-images of the train according to the positions of the couplers.

9. A system for performing security inspection on a train, comprising:
a train type identification system; and
a radiation control module configured to, according to a type of a train under inspection as determined by the train type identification system, control a ray source to irradiate the train under inspection with a first dosage or not irradiate the train under inspection when the train under inspection is a locomotive train or a passenger train, and control the ray source to irradiate the train under inspection with a second dosage when the train under inspection is a freight train, wherein the first dosage is smaller than the second dosage;
wherein the train type identification system comprises:
a train number identification module configured to identify a train number of a train; and
a train type determination module configured to determine a type of the train according to the train number,
wherein the train number identification module is a train number identification system;
wherein the train number identification system comprises:
a processor; and
a memory storing instructions executable by the processor;
wherein the processor is configured to:
obtain a plurality of partial images of a train under inspection which are generated by continuously photographing the train under inspection using a linear-array camera in motion relative to the train under inspection;
splice the plurality of partial images of the train to obtain a spliced image;
correct distortion of the spliced image to obtain a corrected image; and
identify a train number from the corrected image;
wherein the correcting of distortion of the spliced image comprises:
extracting a contour of a wheel from the spliced image;
obtaining a ratio between a horizontal diameter and a vertical diameter of the wheel from the contour;
if the ratio is greater than a first preset threshold, horizontally compressing the spliced image according to the ratio; and if the ratio is smaller than a second preset threshold, horizontally stretching the spliced image.

10. The system according to claim 9, wherein the train type determination module is configured to search a type from a data base or a data list using the train number.

11. The system according to claim 9, wherein the train type determination module is configured to directly determine the type of the train from the train number according to a rule for defining train numbers.

12. The system according to claim 9, wherein the type of the train is any one of a locomotive train, a freight train, and a passenger train.

13. The system according to claim 9, further comprising:
a coupler identification module configured to identify positions of couplers of the train; and
an image partitioning module configured, to partition an image of the train into a plurality of sub-images of the train according to the positions of the couplers.

* * * * *